United States Patent
Wei et al.

[11] Patent Number: 5,805,642
[45] Date of Patent: Sep. 8, 1998

[54] METHOD FOR DETECTING DIFFERENTLY ENCODED SIGNAL SEQUENCES USING A RECURSIVELY COMPUTED REFERENCE SIGNAL

[76] Inventors: Ruey-Yi Wei, 7F., No. 91, La. 71, Chiang Nan St., Nei Hu Chum, Taipei; Mao-Chao Lin, 2F., No. 94-1, Hsiu-Liang Rd., Sec. 1, Yung-Ho, Taipei Hsien, both of Taiwan

[21] Appl. No.: 771,266

[22] Filed: Dec. 20, 1996

[51] Int. Cl.[6] .............................. H04L 27/38; H04L 27/22
[52] U.S. Cl. .......................... 375/340; 375/331; 329/304
[58] Field of Search .................................. 375/261, 264, 375/271, 279, 280, 283, 320, 322, 329, 330, 331, 332, 324, 340; 329/304

[56] References Cited

U.S. PATENT DOCUMENTS 5,017,883  5/1991  Divsalar et al. .......................... 329/304
5,208,836  5/1993  Edbauer ................................. 375/331

OTHER PUBLICATIONS

Leib, H. and Pasupathy, S., "The Phase of a Vector Perturbed by Gaussian Noise and Differentially Coherent Receivers," IEEE Trans. on Information Theory, vol. 34, No. 6, pp. 1491–1501, Nov. 1988.

Adachi, F. and Sawahashi, M., "Decision Feedback Differential Detection of Differentially Encoded 16APSK Signals," IEEE Trans. on Communications, vol. 44, No. 4, pp. 416–418, Apr. 1996.

Hamamoto, N., "Differential Detection with IIR Filter for Improving DPSK Detection Performance," IEEE Trans. on Communications, vol. 44, No. 8, pp. 959–966, Aug. 1996.

*Primary Examiner*—Stephen Chin
*Assistant Examiner*—Jeffrey W. Gluck
*Attorney, Agent, or Firm*—Bacon & Thomas

[57] ABSTRACT

This invention is a method for the detecting received signal sequences of a communication system transmitting a differentially encoded MPSK (Multiple Phase Shift Keying) or a differentially encoded 2MAPSK (2M-level Amplitude/Phase Shift Keying) signal sequence. The operation of detecting the currently received signal sample is based on a signal reference which is recursively generated by two or more previously generated signal references.

14 Claims, 6 Drawing Sheets

METHOD FOR DETECTING DIFFERENTLY ENCODED SIGNAL SEQUENCES USING A RECURSIVELY COMPUTED REFERENCE SIGNAL

BACKGROUND OF THE INVENTION

For a differentially encoded MPSK or 2MAPSK transmission system, differential detection is preferred over coherent detection in case that phase coherence is hard to obtain, where 2MAPSK is a combination of MPSK and 2ASK. The signal constellation of 16APSK(M=8) is shown in FIG. 1. Several one-symbol and multiple-symbol differential detection methods have been proposed before. The error performance of the one-symbol or each multiple-symbol differential detection method is inferior to that of coherent detection. Among the known differential detection methods, the complexity of implementation for a method called decision feedback differential detection (DF-DD) is relatively low. The DF-DD method employs L previously received signal samples and decided messages to detect the currently received signal sample. The operations of DF-DD for differentially encoded MPSK and 2MAPSK transmission systems can be briefly described as follows.

Suppose that a differentially encoded MPSK or 2MAPSK signal sequence is transmitted over a communication channel. Let r(t) be the received signal for time t. Let T be the time interval between two adjacent received signal samples. The received signal sequence $\{r(t): -\infty < t < \infty\}$ is passed through a matched filter and sampled at t=kT.

The received signal sample for time kT is $$r_k = \sqrt{2P}\ a_k e^{j\phi_k} e^{j\theta_k} + N_k,$$

where P is the signal power, $\phi_k$ is the modulation phase, $\theta_k$ is an arbitrary phase, $N_k$ is a sample of noise, and $\alpha_k = 1$ if the MPSK signal sequence is transmitted; $\alpha_k \in \{\alpha_{Lo}, \alpha_{Hi}\}$ if the 2MAPSK signal sequence is transmitted. Let $\alpha = \alpha_{Hi}/\alpha_{Lo}$ (>1). Setting $0.5(\alpha_{Hi}^2 + \alpha_{Lo}^2) = 1$, we have $\alpha_{Lo} = \sqrt{2/(\alpha^2+1)}$ and $\alpha_{Hi} = \alpha\sqrt{2/(\alpha^2+1)}$. The modulation phase $\phi_k$ takes on one of the M values of $\{\beta_0, \beta_1, \ldots, \beta_{M-1}\}$, where $\beta_m = (2\pi m/M) + \phi$ for m=0, 1, ... M−1, and $\phi$ is a constant. For a differentially encoded MPSK sequence, the messages for time kT are carried by the message phase $\Delta\phi_k = \phi_k - \phi_{k-1} \in \{\beta_0, \beta_1, \ldots, \beta_{M-1}\}$. For a differentially encoded 2MAPSK sequence, the messages for time kT are carried by the message phase and the message amplitude, where the message phase is $\Delta\phi_k = \phi_k - \phi_{k-1}$ and the message amplitude can be either the amplitude $a_k$ or the ratio of amplitudes $\Delta\alpha_k = \alpha_k/\alpha_{k-1}$. If the message amplitude for time kT is carried by $\Delta\alpha_k$, then the signal amplitudes $\alpha_k$ and $\alpha_{k-1}$ are distinct when the corresponding message bit is "7 1", and the signal amplitudes $\alpha_k$ and $\alpha_{k-1}$ are identical when the corresponding message bit is "0".

The decision rule of DF-DD for a differentially encoded MPSK sequence [1–3] is to decide the message phase $\Delta\bar{\phi}_n$ for time nT as the $\Delta\phi_n$ value that maximizes $$\sum_{l=1}^{L} Re\{r_n r^*_{n-1} e^{-j\Delta\phi_n} e^{-j\sum_{i=1}^{l-1}\Delta\bar{\phi}_{n-i}}\},$$

where $\Delta\phi_n \in \{\beta_0, \beta_1, \ldots, \beta_{M-1}\}$, $\Delta\bar{\phi}_{n-i}$ is the message phase that has already been decided for time (n−i)T and "*" represents the complex conjugate operation.

The decision rule of DF-DD for a differentially encoded 2MAPSK sequence to determine $\Delta\bar{\phi}_n$ and $\Delta\bar{\alpha}_n$ for time nT can be decomposed into two steps [4]. For the first step, $\Delta\bar{\phi}_n$ is determined as the $\Delta\phi_n$ value that maximizes $Re\{r_n r^*_{n-1,ref} \exp(-j\Delta\phi_n)\}$, where $\Delta\phi_n \in \{\beta_0, \beta_1, \ldots, \beta_{M-1}\}$, $r_{n-1,ref}$ is a signal reference calculated by $$r_{n-1,ref} = \frac{\sum_{l=1}^{L} r_{n-l}\ \Delta\bar{a}_{l-1}^{-1} e^{j\Delta\bar{\phi}_{n-i}}}{\sum_{l=1}^{L} \Delta\bar{a}_{l-i}^{-2}},$$

and $\Delta\bar{\alpha}_{n-i}$ and $\Delta\bar{\phi}_{n-i}$ are the decided values of $\Delta\alpha_{n-i}$ and $\Delta\phi_{n-i}$ respectively for time (n−i)T. For the second step, $\Delta\bar{\alpha}_n$ is decided to be $$\Delta\bar{a}_n = \begin{cases} a & \text{if } \Delta\hat{a}_n > \Delta\hat{a}_{Hi}, \\ 1/a & \text{if } \Delta\hat{a}_n < \Delta a_{Lo}, \\ 1 & \text{if } \Delta a_{Lo} \leq \Delta a_{n+1} \leq \Delta a_{Hi}, \end{cases}$$

where $\Delta\alpha_{Hi}$ and $\Delta\alpha_{Lo}$ are thresholds, and $$\Delta\hat{a}_n = Re\{r_n r^*_{n-1,ref} \exp(-j\Delta\bar{\phi}_n)\}/|r_{n-1,ref}|^2.$$

DF-DD can achieve pretty good error performance with relatively low complexity. However, there is still much room for improvement.

In U.S. patent application No.08/654125 [5], Wei and Lin proposed a differential detection method, in which the current detection operation employs a phase (or phase difference) reference. With the introduction of proper weight factors, the phase (or phase difference) reference can be generated from a recursive form. The input of the method in [5] is a sequence of phases or phase differences of received signal samples.

Recently, a differential detection method [6] was introduced which employs a signal reference that is recursively generated by a previously generated signal reference. The input of the method used in [6] is the sequence of received signal samples. However, for a time-varying channel, the method of [6] may not perform well due to the contribution of unreliable signal samples received a long time ago.

In this invention, we propose a differential detection method, for which the input is a sequence of received signal samples and the current detection operation employs a signal reference which is recursively generated by two or more previously generated signal references. By properly assigning weight factors in the recursive form, we can reduce the contribution of unreliable signal samples received a long time ago. The proposed differential detection method can be applied to both a differentially encoded MPSK sequence and a differentially encoded 2MAPSK sequence.

SUMMARY OF THE INVENTION

This invention is a method for detecting the received signal sequence of a communication system transmitting a differentially encoded MPSK or 2MAPSK signal sequence. This method uses two or more previously generated signal references to recursively generate a signal reference for the current operation of detecting the received signal sample. The differential detection method of this invention has very low complexity of detection and has the advantage of increased flexibility in arranging the contribution of previously received signal samples in the generated signal reference and the error performance can be very good for either the AWGN (Additive White Gaussian Noise) channel or the time-varying channel.

and $$V_3 = \frac{\Delta\bar{a}_n\Delta\bar{a}_{n-1}}{\Delta\bar{a}_n{}^2\Delta\bar{a}_{n-1}^2 + W_1\Delta\bar{a}_n{}^2 + W_2};$$

Figure 5:
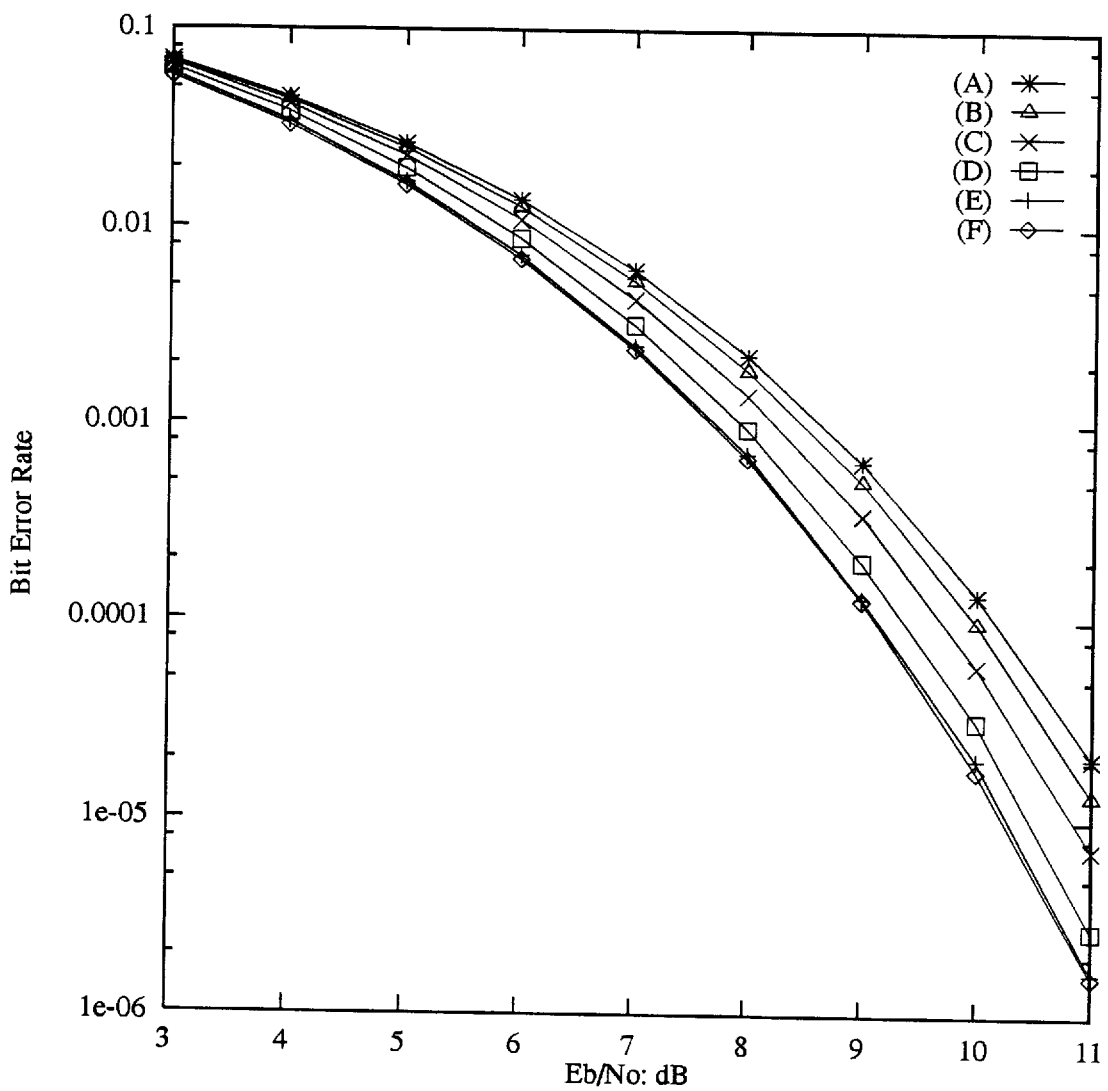
Figure 6:
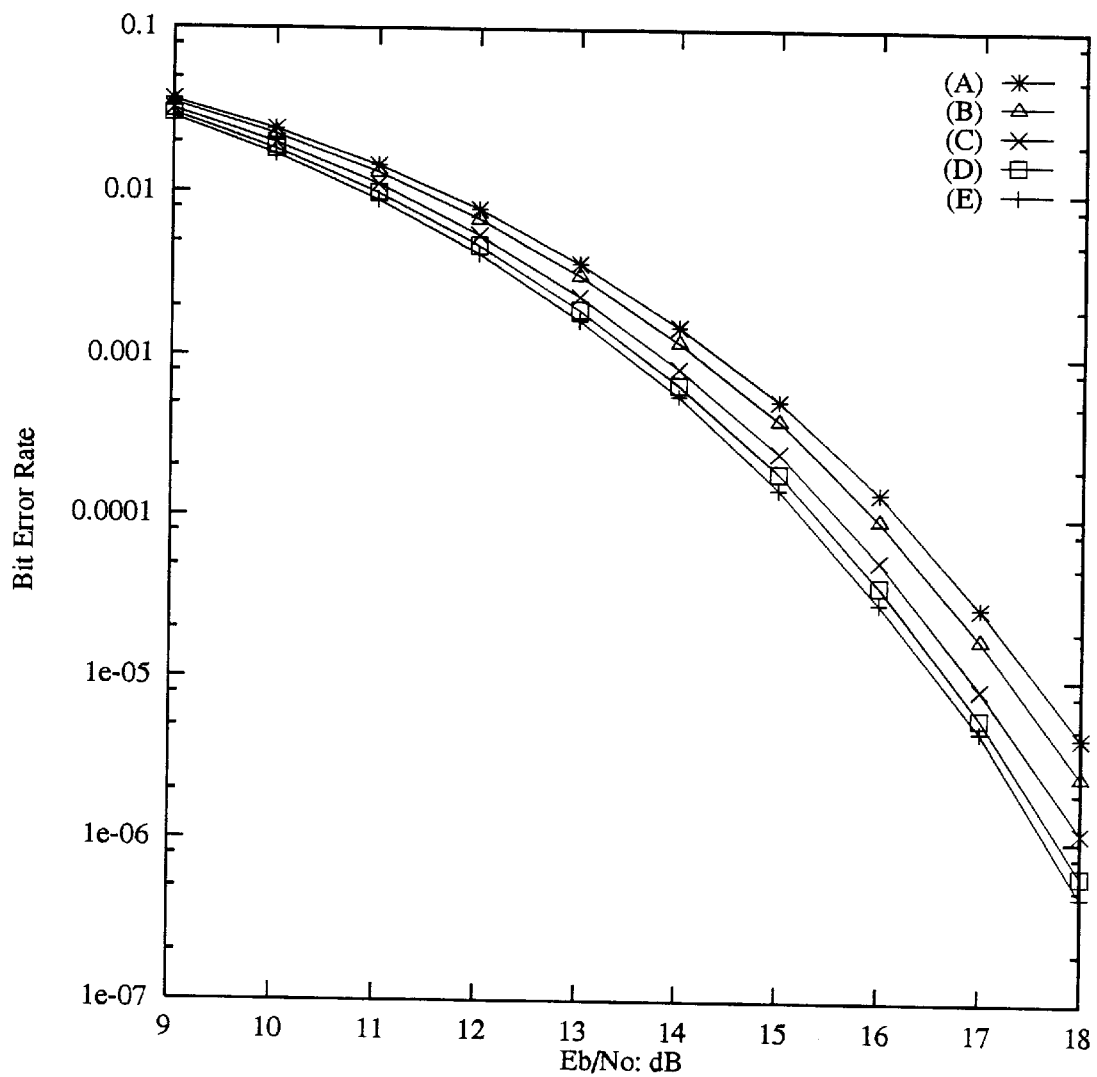

FIG. 5 illustrates simulation results of the first embodiment for QPSK with various weight factors, where $\omega_1=0.2$ and $\omega_2=0$ for curve (A), $\omega_1=0.3$ and $\omega_2=-0.01$ for curve (B), $\omega_1=0.5$ and $\omega_2=-0.05$ for curve (C), $\omega_1=0.8$ and $\omega_2=-0.15$ for curve (D), $\omega_1=1.1$ and $\omega_2=-0.3$ for curve (E), $\omega_1=0.75$ and $\omega_2=0$ for curve(F);

FIG. 6 illustrates simulation results of the second embodiment for 16APSK with various weight factors, where $W_1=0.2$ and $W_2=0$ for curve (A), $W_1=0.4$ and $W_2=-0.01$ for curve (B), $W_1=1.0$ and $W_2=-0.1$ for curve (C), $W_1=2.0$ and $W_2=-0.4$ for curve (D), $W_1=8.0$ and $W_2=-2.0$ for curve (E).

DESCRIPTION OF THE PREFERRED EMBODIMENTS

This invention is a method for detecting the received signal sequence of a communication system transmitting a differentially encoded MPSK or 2MAPSK signal sequence.

For a system receiving a differentially encoded MPSK sequence, the output of the detection operation of the invention for time $(n+1)T$ is the message phase $\Delta\bar{\phi}_{n+1}$. In this invention, $\Delta\bar{\phi}_n$ is chosen as the $\Delta\phi_{n+1}$ value that maximizes $\text{Re}\{r_{n+1}r^*_{n,ref}e^{-\Delta\phi_{n+1}}\}$, where $\Delta\phi_{n+1} \in \{\beta_0,\beta_1,\ldots,\beta_{M-1}\}$ and the parameter $r_{n,ref}$ is a signal reference for time nT, which is recursively generated by two or more previously generated signal references. Specifically, $r_{n,ref}$ is a function of $r_{n-1,ref}, r_{n-2,ref}, \ldots, r_{n-\nu,ref}, e^{j\Delta\bar{\phi}_n}, e^{j\Delta\bar{\phi}_{n-1}}, \ldots, e^{j\Delta\bar{\phi}_{n-\mu}}, r_n, r_{-1},$ and $r_{n-\zeta}$, where $\nu, \mu$ and $\zeta$ are nonnegative integers with $\nu \geq 2$.

We now show a recursive form which can easily generate the weighted signal reference $r_{n,ref}$ at time nT for detecting the received signal sequence of a communication system transmitting a differentially encoded MPSK sequence. The recursive form is given by $$r_{n,ref} = \quad (1)$$

$$\begin{cases} \frac{W_n^{(0)}r_n + W_n^{(1)}r_{n-1,ref}e^{j\Delta\bar{\phi}_n} + W_n^{(2)}r_{n-2,ref}e^{j(\Delta\bar{\phi}_n+\Delta\bar{\phi}_{n-1})}}{W_n^{(0)} + W_n^{(1)} + W_n^{(2)}}, & \text{for } n \geq 1, \\ r_0, & \text{for } n = 0, \end{cases}$$

where $W_n^{(0)}$, $W_n^{(1)}$ and $W_n^{(2)}$ are weight factors chosen for time nT.

Figure 1:
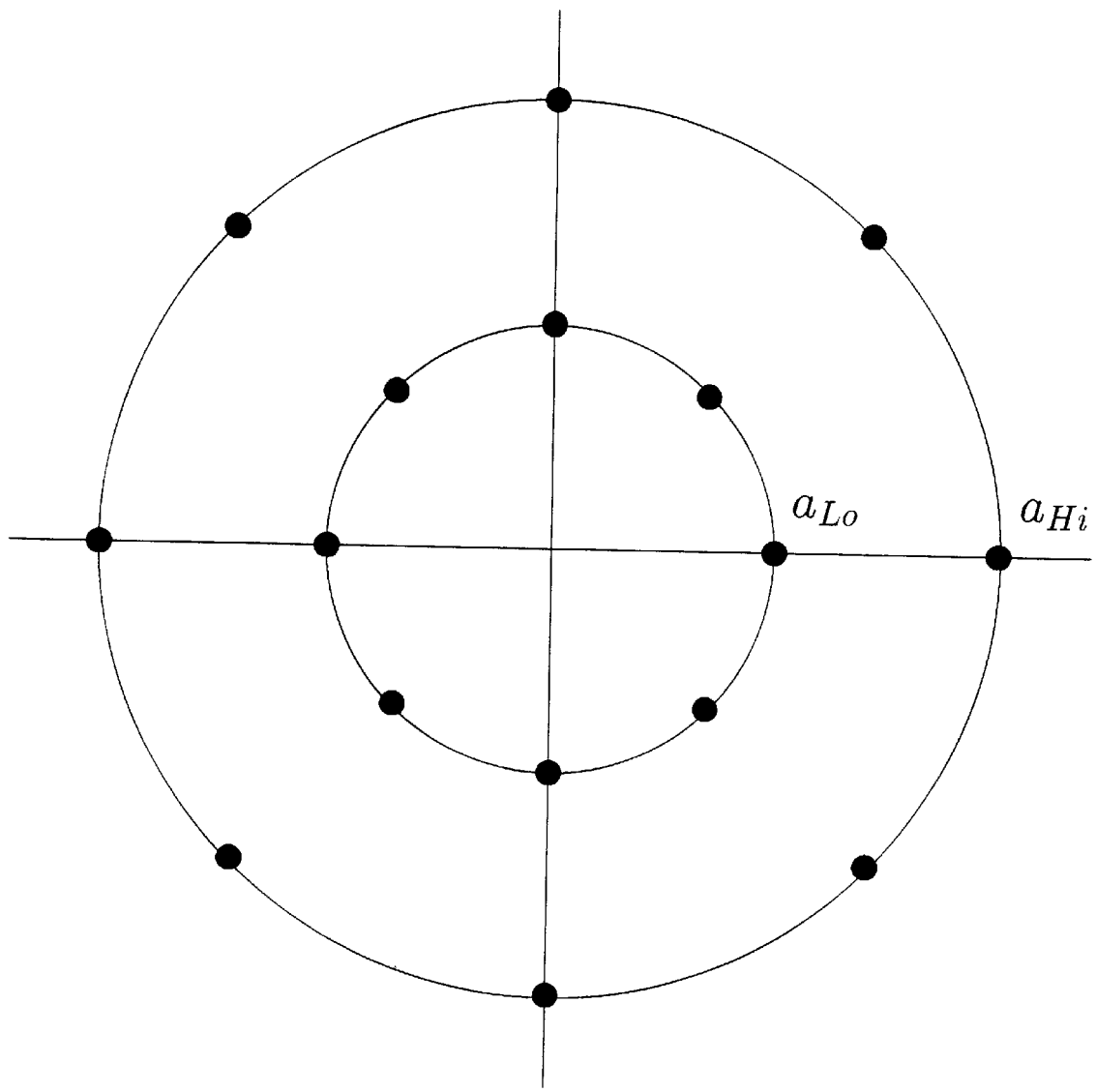
FIG. 1 illustrates the signal constellation of 16APSK.
Figure 2:
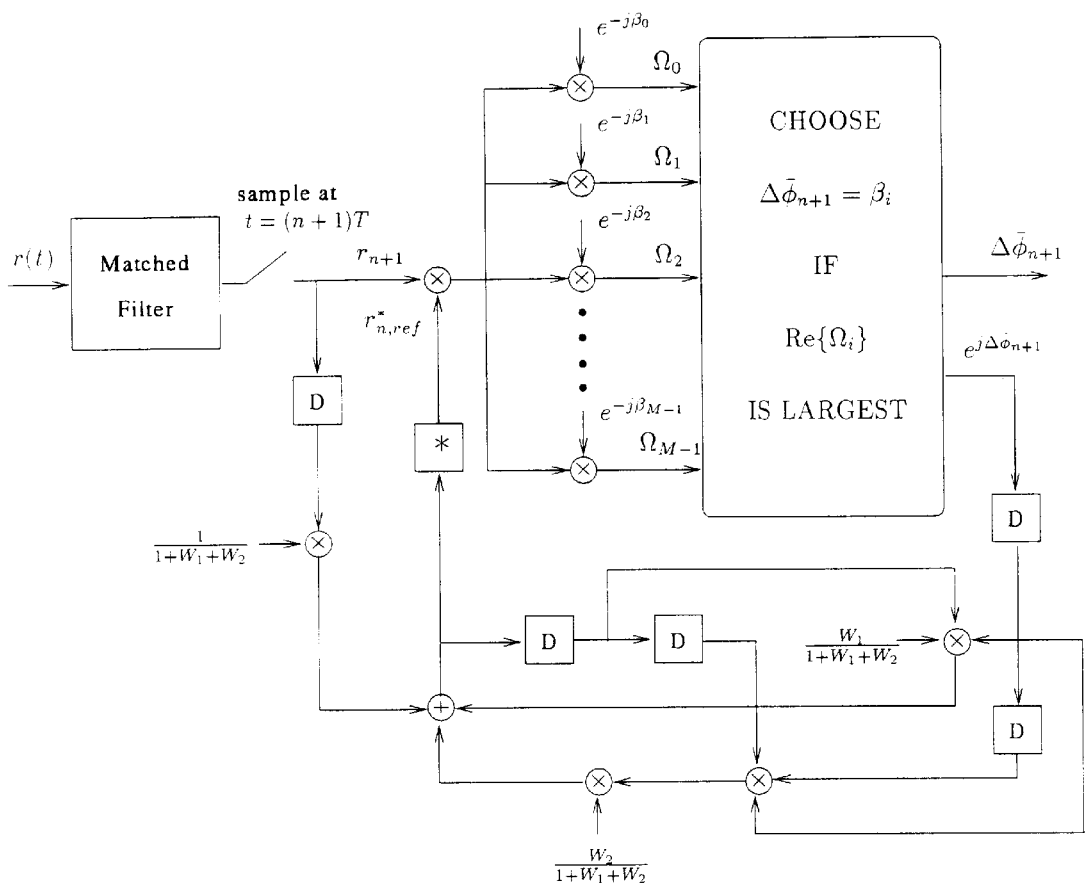
FIG. 2 illustrates the functional block diagram in complex form for implementing the first embodiment.

For the first embodiment, we use a sequence of received MPSK signal samples as input to generate a sequence of message phases as output. In the first embodiment, equation (1) is used with $W_n^{(0)}=1$, $W_n^{(1)}=W_1$ and $W_n^{(2)}=W_2$. The functional block diagram in complex form for implementing the first embodiment is shown in FIG. 2.

Figure 3:
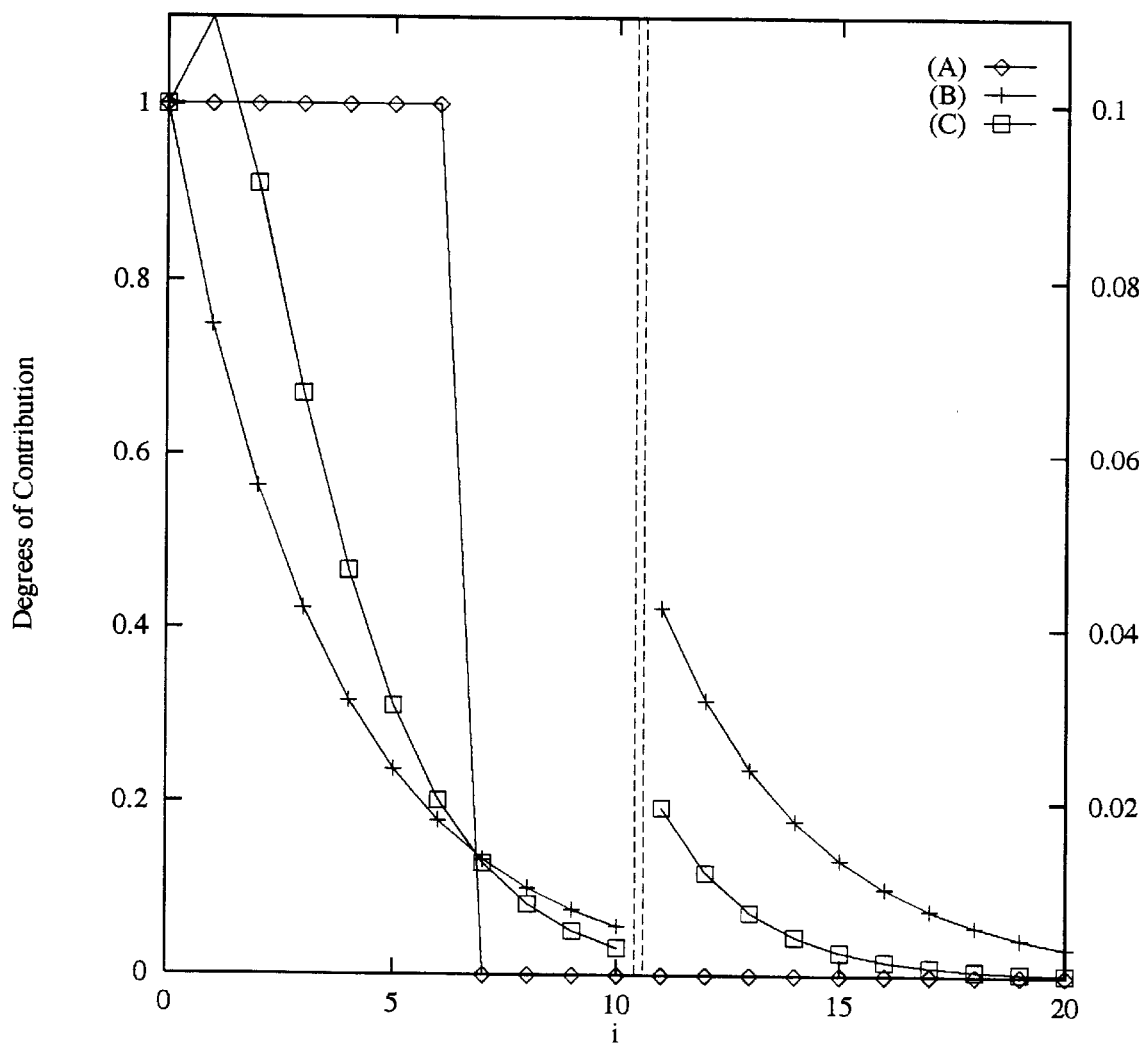
FIG. 3 illustrates the degree of contribution from DF-DD using L=7 which is shown in curve (A), the degree of contribution from a method of [6] using $W_1=3$ ($\omega_1=0.75$, $\omega_2=0$) which is shown in curve (B), and the degree of contribution from the first embodiment using $\omega_1=1.1$ and $\omega_2=-0.3$ which is shown in curve (C) respectively, where $$w_1 = \frac{W_1}{1+W_1+W_2} \text{ and } w_2 = \frac{W_2}{1+W_1+W_2}.$$

Each signal reference generated in DF-DD, in the method of [6] and in the first embodiment can be represented as a weighted sum of all the primitive signal references derived from previously received signal samples, i.e., $$r_{n,ref} = a_0 r_n + \sum_{i=1}^{\infty} a_i r_{n-i} e^{j\sum_{l=0}^{i-1}\Delta\bar{\phi}_{n-l}}.$$

where $$r_{n-i} e^{j\sum_{l=0}^{i-1}\Delta\bar{\phi}_{n-l}}$$

is the primitive signal reference derived from $r_{n-i}$. The weight $\alpha_i$ shows the degree of contribution from $r_{n-i}$ in forming the signal reference $r_{n,ref}$. For DF-DD, only the most recently received L signal samples provide contribution. To achieve good error performance in the AWGN channel requires large L, while the complexity of detection increases with increasing L. The method of [6] can be considered as the case of the first embodiment by setting $W_2=0$. For the method of [6], each of the previously received signal samples provide a share of contribution for the current signal reference. The degree of contribution, $a_i$, decays exponentially with increasing i, while an increased $W_1$ will decrease the speed of decay. The complexity of detection is independent of $W_1$, while larger $W_1$ will provide better error performance in the AWGN channel. However, for a time varying channel, if a large $W_1$ is used, the contribution from unreliable signal samples received a long time ago will constitute a significant portion of the current signal reference. Hence, the error performance may be greatly deteriorated. For the method of the first embodiment, each of the previously received signal samples provides a share of contribution for the signal reference. However, there are two parameters, $W_1$ and $W_2$, in arranging the degrees of contribution from received signal samples. Therefore, it is possible to reduce the contribution from signal samples received a long time ago. Hence, its error performance will be better in the time varying channel. FIG. 3 shows degrees of contribution from previously received signal samples in the current signal reference for an example of DF-DD, an example of the method of [6] and an example of the first embodiment, respectively, where all the examples provide an error rate of about $1.5 \times 10^{-6}$ at a signal to noise ratio of 11 dB.

In some applications, the signal reference $r_{n,ref}$ can be generated by more than two previously received signal references so that there is even more freedom in arranging the degree of contribution from previously received signal samples in deriving the signal reference. Hence, the error performance will be even better for a time varying channel.

The recursive form is given by $$r_{n,ref} = \begin{cases} \dfrac{W_n^{(0)} r_n + \sum_{l=1}^{v} W_n^{(l)} r_{n-l,ref} e^{j \sum_{m=0}^{l-1} \Delta\bar{\phi}_{n-m}}}{\sum_{l=0}^{v} W_n^{(l)}}, & \text{for } n \geq 1, \\ r_0, & \text{for } n = 0, \end{cases} \quad (2)$$

where $W_n^l$, for $l \in \{0,1,2,\ldots,v\}$ is the weight factor chosen for time nT and $v$ is an integer greater than 2.

For a system receiving a differentially encoded 2MAPSK sequence, the output of the detection operation of the invention for time (n+1)T includes the message phase and the message amplitude. The decided message amplitude for time (n+1)T can be either the amplitude $\bar{\alpha}_{n+1}$ or the ratio of amplitudes $\Delta\bar{\alpha}_{n+1} = \alpha_{n+1}/\alpha_n$. For either case, the first step of the detection in this invention is to decide the message phase and the second step is to decide the message amplitude. Consider the case that the decided message amplitude for time (n+1)T is $\Delta\bar{\alpha}_{n+1}$. For the first step, $\Delta\bar{\phi}_{n+1}$ is chosen as the $\Delta\phi_{n+1}$ value that maximizes $\text{Re}\{r_{n+1} r^*_{n,ref} e^{-j\Delta\phi_{n+1}}\}$, where $\Delta\phi_{n+1} \in \{\beta_0, \beta_1, \ldots, \beta_{M-1}\}$ and the parameter $r_{n,ref}$ is a signal reference for time nT, which is recursively generated by two or more previously generated signal references. Specifically, $r_{n,ref}$ is a function of $r_{n-1,ref}, r_{n-2,ref}, \ldots, r_{n-v,ref}, e^{j\Delta\bar{\phi}_n}, \ldots, e^{j\Delta\bar{\phi}_{n-\mu}}, \Delta\bar{\phi}_n, \Delta\bar{\alpha}_n, \Delta\bar{\alpha}_{n-1}, \ldots, \Delta\bar{\alpha}_{n-\lambda}, r_n, r_{-1}$, and $r_{n-\zeta}$, where $v, \mu, \lambda$ and $\zeta$ are nonnegative integers with $v \geq 2$. For the second step, $\Delta\bar{\alpha}_{n+1}$ is decided to be $$\Delta\bar{\alpha}_{n+1} = \begin{cases} a & \text{if } \Delta\hat{a}_{n+1} > \Delta a_{Hi}, \\ 1/a & \text{if } \Delta\hat{a}_{n+1} < \Delta a_{Lo}, \\ 1 & \text{if } \Delta a_{Lo} \leq \Delta\hat{a}_{n+1} \leq \Delta a_{Hi}, \end{cases}$$

where $\Delta\alpha_{Hi}$ and $\Delta\alpha_{Lo}$ are thresholds and $$\Delta\hat{a}_{n+1} = \text{Re}\{r_{n+1} r^*_{n,ref} \exp(-j\Delta\bar{\phi}_{n+1})\}/|r_{n,ref}|^2.$$

We now show a recursive form which can generate the weighted signal reference $r_{n,ref}$ at time nT for detecting the received signal sequence of a communication system transmitting a differentially encoded 2MAPSK sequence. The recursive form is given by $$r_{n,ref} = \qquad (3)$$

$$\begin{cases} \dfrac{W_n^{(0)} r_n + \sum_{l=1}^{v} W_n^{(l)} \prod_{m=0}^{l-1} \Delta\bar{q}_{-m}^{-1} r_{n-l,ref} e^{j \sum_{m=0}^{l-1} \Delta\bar{\phi}_{n-m}}}{W_n^{(0)} + \sum_{l=0}^{v} W_n^{(l)} \prod_{m=0}^{l-1} \Delta\bar{q}_{-m}^{-2}}, & \text{for } n \geq 1, \\ r_0, & \text{for } n = 0, \end{cases}$$

where $W_n^{(l)}$, for $l \in \{0,1,2,\ldots,v\}$ is the weight factor chosen for time nT and $v$ is an integer greater than 1.

Figure 4:
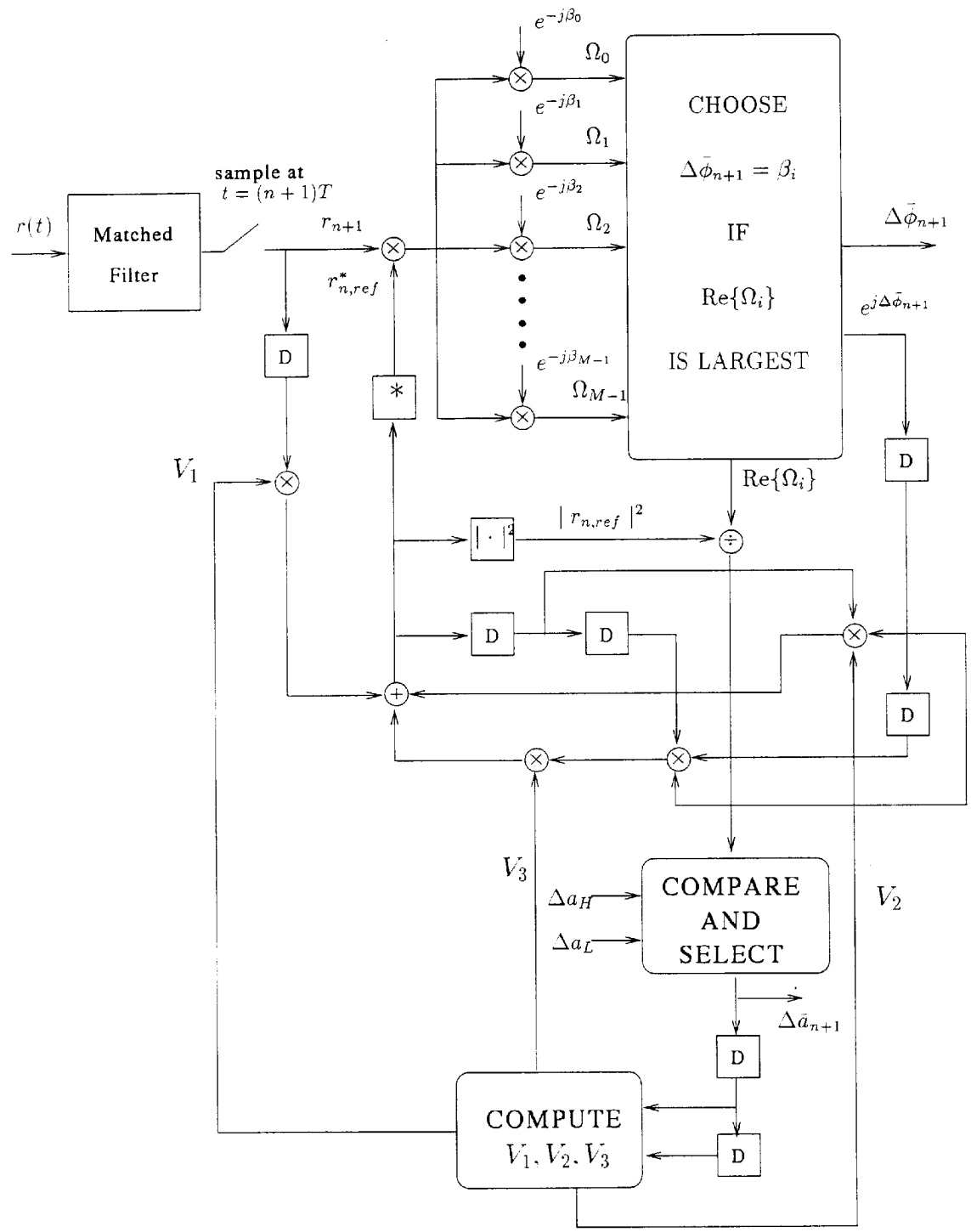
FIG. 4 illustrates the functional block diagram in complex form for implementing the second embodiment, where $$V_1 = \frac{\Delta\bar{a}_n{}^2\Delta\bar{a}_{n-1}^2}{\Delta\bar{a}_n{}^2\Delta\bar{a}_{n-1}^2 + W_1\Delta\bar{a}_n{}^2 + W_2}, \quad V_2 = \frac{W_1\Delta\bar{a}_n\Delta\bar{a}_{n-1}^2}{\Delta\bar{a}_n{}^2\Delta\bar{a}_{n-1}^2 + W_1\Delta\bar{a}_n{}^2 + W_2}$$

For the second embodiment, we use a sequence of the received 2MAPSK signal samples as input to generate a sequence of message phases and message amplitudes as output. In the second embodiment, equation (3) is used with $v=2$, $W_n^{(0)}=1$, $W_n^{(1)}=W_1$ and $W_n^{(2)}=W_2$ for all n. The functional block diagram in complex form for implementing the second embodiment is shown in FIG. 4.

In some applications, the decided message amplitude for time (n+1)T is $\bar{\alpha}_{n+1}$. For this case, the detection operation can be divided into two steps. For the first step, $\Delta\bar{\phi}_{n+1}$ is chosen as the $\Delta\phi_{n+1}$ value that maximizes $\text{Re}\{r_{n+1} r^*_{n,ref} e^{-j\Delta\phi^{n+1}}\}$, where $\Delta\phi_{n+1} \in \{\beta_0, \beta_1, \ldots, \beta_{M-1}\}$ and the parameter $r_{n,ref}$ is a signal reference for time nT, which is recursively generated by two or more previously generated signal references. Specifically, $r_{n,ref}$ is a function of $r_{n-1,ref}, r_{n-2,ref}, \ldots, r_{n-v,ref}, e^{j\Delta\bar{\phi}_n}, e^{j\Delta\bar{\phi}_{n-1}}, \ldots, e^{j\Delta\bar{\phi}_{n-\mu}}, \bar{\alpha}_n, \bar{\alpha}_{n-1}, \ldots, \bar{\alpha}_{n-\lambda}, r_n, r_{n-1}$, and $r_{n-\zeta}$, where $v, \mu, \lambda$ and $\zeta$ are nonnegative integers with $v \geq 2$. For the second step, $\bar{A}_{+1}$ is decided to be $$\bar{a}_{n+1} = \begin{cases} 1 & \text{if } |r_{n+1}| \geq \delta, \\ 0 & \text{if } |r_{n+1}| < \delta, \end{cases}$$

where $\delta$ is a threshold which may be a constant or may be a function of $\Delta\bar{\phi}_{n+1}$.

Error performance of the detection using the first embodiment for QPSK(M=4) signals and the second embodiment for 16APSK(M=8) signals with various weight factors over the AWGN channel which are derived from simulations, are given in FIG. 5 and 6 respectively.

The complexity of detection using the proposed method is independent of the assigned weight factors if we disregard the complexity of significant bits required for different members. It is better to choose the weight factors by considering the varying speed of the channel.

In some applications, the signal reference $r_{0,ref}$ at the beginning time of operation (n=0) can be an arbitrarily assigned value to simplify the implementation.

What is claimed is:

1. A method for detecting the received signal sequences of a communication system transmitting a differentially encoded MPSK signal sequence, which results in an output for an (n+1)-th detection operation given by $\Delta\bar{\phi}_{n+1}$ that is determined by the steps of calculating a signal reference $r_{n,ref}$ which is recursively generated and is a function of $r_{n-1,ref}, r_{n-2,ref}, \ldots, r_{n-v,ref}, e^{j\Delta\bar{\phi}_n}, e^{j\Delta\bar{\phi}_{n-1}}, \ldots, e^{j\Delta\bar{\phi}_{n-\mu}}, r_n, r_{n-1}, \ldots$ and $r_{n-\zeta}$, and then choosing $\Delta\bar{\phi}_{n+1}$ as the $\Delta\phi_{n+1}$ value that maximizes $\text{Re}\{r_{n+1} r^*_{n,ref} \exp(-j\Delta\phi_{n+1})\}$, wherein $r_n, r_{n-1}, \ldots, r_{n-\zeta}$ are the received signal samples and $v, \mu$ and $\zeta$ are nonnegative integers, $v \geq 2$.

2. A method for detecting the received signal sequences of a communication system transmitting a differentially encoded MPSK signal sequence as in claim 1, wherein said $r_{n,ref}$ is generated by $$r_{n,ref} = \begin{cases} \dfrac{W_n^{(0)} r_n + \sum_{l=1}^{v} W_n^{(l)} r_{n-l,ref} e^{j \sum_{m=0}^{l-1} \Delta\bar{\phi}_{n-m}}}{\sum_{l=0}^{v} W_n^{(l)}}, & \text{for } n \geq 1, \\ r_0, & \text{for } n = 0, \end{cases}$$

wherein $W_n^{(l)}$, for $l \in \{0,1,2,\ldots,v\}$ is the weight factor chosen for time nT and $v$ is an integer greater than 1.

3. A method for detecting the received signal sequences of a communication system transmitting a differentially encoded MPSK signal sequence as in claim 2, wherein said $r_{0,ref}$ is an arbitrarily assigned value instead of $r_0$.

4. A method for detecting the received signal sequences of a communication system transmitting a differentially encoded MPSK signal sequence as in claim 2, wherein said $W_n^{(l)}$ is assigned as a value $W_l$ which is independent of n for $l \in \{0,1,2,\ldots,v\}$.

5. A method for detecting the received signal sequences of a communication system transmitting a differentially encoded 2MAPSK signal sequence, which results in an output for an (n+1)-th detection operation that includes the decided message phase, $\Delta\bar{\phi}_{n+1}$, and the decided message amplitude, $\Delta\bar{\alpha}_{n+1}$, of which the decided message phase, $\Delta\bar{\phi}_{n+1}$ is determined by the steps of first calculating a signal reference $r_{n,ref}$ that is recursively generated and is a function of $r_{n-1,ref}$, $r_{n-2,ref}$, ..., $r_{n-v,ref}$, $e^{j\Delta\overline{\phi}_n}$, $e^{j\Delta\overline{\phi}_{n-1}}$, ..., $e^{j\Delta\overline{\phi}_{n-\mu}}$, $\Delta\overline{\alpha}_n$, $\Delta\overline{\alpha}_{n-1}$, ..., $\Delta\overline{\alpha}_{n-\lambda}$, $r_n$, $r_{n-1}$, ... and $r_{n-\zeta}$, and then choosing $\Delta\overline{\phi}_{n+1}$ as the $\Delta\phi_{n+1}$ value that maximizes $\text{Re}\{r_{n+1}r^*_{n,ref}\exp(-j\Delta\phi_{n+1})\}$, wherein $r_n$, $r_{n-1}$, ..., $r_{n-\zeta}$ are the received signal sample and $v, \mu, \lambda$ and $\zeta$ are nonnegative integers, $v \geq 2$.

6. A method for detecting the received signal sequences of a communication system transmitting a differentially encoded 2MAPSK signal sequence as in claim 5, wherein said decided message amplitude $\Delta\overline{\alpha}_{n+1}$ is obtained by $$\Delta\overline{a}_{n+1} = \begin{cases} a & \text{if } \Delta\hat{a}_{n+1} > \Delta a_{Hi}, \\ 1/a & \text{if } \Delta\hat{a}_{n+1} < \Delta a_{Lo}, \\ 1 & \text{if } \Delta a_{Lo} \leq \Delta\hat{a}_{n+1} \leq \Delta a_{Hi}, \end{cases}$$

wherein $\Delta\hat{\alpha}_{n+1} = \text{Re}\{r_{n+1}r^*_{n,ref}\exp(-j\Delta\overline{\phi}_{n+1})\}/|r_{n,ref}|^2$, and $\Delta\alpha_{Hi}$ and $\Delta\alpha_{Lo}$ are thresholds.

7. A method for detecting the received signal sequences of a communication system transmitting a differentially encoded 2MAPSK signal sequence as in claim 5, wherein said $r_{n,ref}$ is generated by $$r_{n,ref} = \begin{cases} \dfrac{W_n^{(0)} r_n + \sum\limits_{l=1}^{v} W_n^{(l)} \prod\limits_{m=0}^{l-1} \Delta\overline{q}_{n-m}^{-1} r_{n-l,ref} e^{j\sum\limits_{m=0}^{l-1}\Delta\overline{\phi}_{n-m}}}{W_n^{(0)} \sum\limits_{l=0}^{v} W_n^{(l)} \prod\limits_{m=0}^{l-1} \Delta\overline{q}_{n-m}^{-2}}, & \text{for } n \geq 1, \\ r_0, & \text{for } n = 0, \end{cases}$$

wherein $W_n^{(l)}$, for $l \in \{0,1,2, ..., v\}$ is the weight factor chosen for time nT and $v$ is an integer greater than 1.

8. A method for detecting the received signal sequences of a communication system transmitting a differentially encoded 2MAPSK signal sequence as in claim 7, wherein said $r_{0,ref}$ is an arbitrarily assigned value instead of $r_0$.

9. A method for detecting the received signal sequences of a communication system transmitting a differentially encoded 2MAPSK signal sequence as in claim 7, wherein said $W_n^{(l)}$ is assigned as a value $W_l$ which is independent of n for $l \in \{0,1,2, ..., v\}$.

10. A method for detecting the received signal sequences of a communication system transmitting a differentially encoded 2MAPSK signal sequence, which results in an output for an $(n+1)$-th detection operation that includes the decided message phase, $\Delta\overline{\phi}_{n+1}$, and the decided message amplitude $\overline{\alpha}_{+1}$, of which the decided message phase, $\Delta\overline{\phi}_{n+1}$ is determined by the steps of first calculating a signal reference $r_{n,ref}$ that is recursively generated and is a function of $r_{n-1,ref}$, $r_{n-2,ref}$, ..., $r_{n-v,ref}$, $e^{j\Delta\overline{\phi}_n}$, $e^{j\Delta\overline{\phi}_{n-1}}$, ..., $e^{j\Delta\overline{\phi}_{n-\mu}}$, $\overline{\alpha}_n$, $\overline{\alpha}_{n-1}$, ..., $\overline{\alpha}_{n-\lambda}$, $r_n$, $r_{-1}$, ... and $r_{n-\zeta}$, and then choosing $\Delta\overline{\phi}_{n+1}$ as the $\Delta\phi_{n+1}$ value that maximizes $\text{Re}\{r_{n+1}r^*_{n,ref}\exp(-j\Delta\phi_{n+1})\}$, wherein $r_n$, $r_{n-1}$, ..., $r_{n-\zeta}$ are the received signal samples and $v, \mu, \lambda$ and $\zeta$ are nonnegative integers, $v \geq 2$.

11. A method for detecting the received signal sequences of a communication system transmitting a differentially encoded 2MAPSK signal sequence as in claim 10, wherein said decided message amplitude $\overline{\alpha}_{n+1}$ is obtained by $$\overline{a}_{n+1} = \begin{cases} 1 & \text{if } |r_{n+1}| \geq \delta, \\ 0 & \text{if } |r_{n+1}| < \delta, \end{cases}$$

wherein $\delta$ is a threshold.

12. A method for detecting the received signal sequences of a communication system transmitting a differentially encoded 2MAPSK signal sequence as in claim 10, wherein said $r_{n,ref}$ is generated by $$r_{n,ref} = \begin{cases} \dfrac{W_n^{(0)} r_n + \sum\limits_{l=1}^{v} W_n^{(l)} \prod\limits_{m=0}^{l-1} \Delta\overline{q}_{n-m}^{-1} r_{n-l,ref} e^{j\sum\limits_{m=0}^{l-1}\Delta\overline{\phi}_{n-m}}}{W_n^{(0)} \sum\limits_{l=0}^{v} W_n^{(l)} \prod\limits_{m=0}^{l-1} \Delta\overline{q}_{n-m}^{-2}}, & \text{for } n \geq 1, \\ r_0, & \text{for } n = 0, \end{cases}$$

wherein $W_n^{(l)}$, for $l \in \{0,1,2, ..., v\}$ is the weight factor chosen for time nT, $v$ is an integer greater than 1 and $$\Delta\overline{a}_i = \dfrac{\overline{a}_i}{\overline{a}_{i-1}}.$$

13. A method for detecting the received signal sequences of a communication system transmitting a differentially encoded 2MAPSK signal sequence as in claim 12, wherein said $r_{0,ref}$ is an arbitrarily assigned value instead of $r_0$.

14. A method for detecting the received signal sequences of a communication system transmitting a differentially encoded 2MAPSK signal sequence as in claim 12, wherein said $W_n^{(l)}$ is assigned as a value $W_l$ which is independent of n for $l \in \{0,1,2, ..., v\}$.

* * * * *